Jan. 11, 1938. W. S. RENDALL 2,105,266
METHOD OF AND APPARATUS FOR PROPORTIONING AND
BLENDING GLASS BATCH MATERIALS AND THE LIKE
Filed Oct. 31, 1936 4 Sheets-Sheet 3

Inventor
William Stanley Rendall
By Cushney Darby Cushman
Attorneys

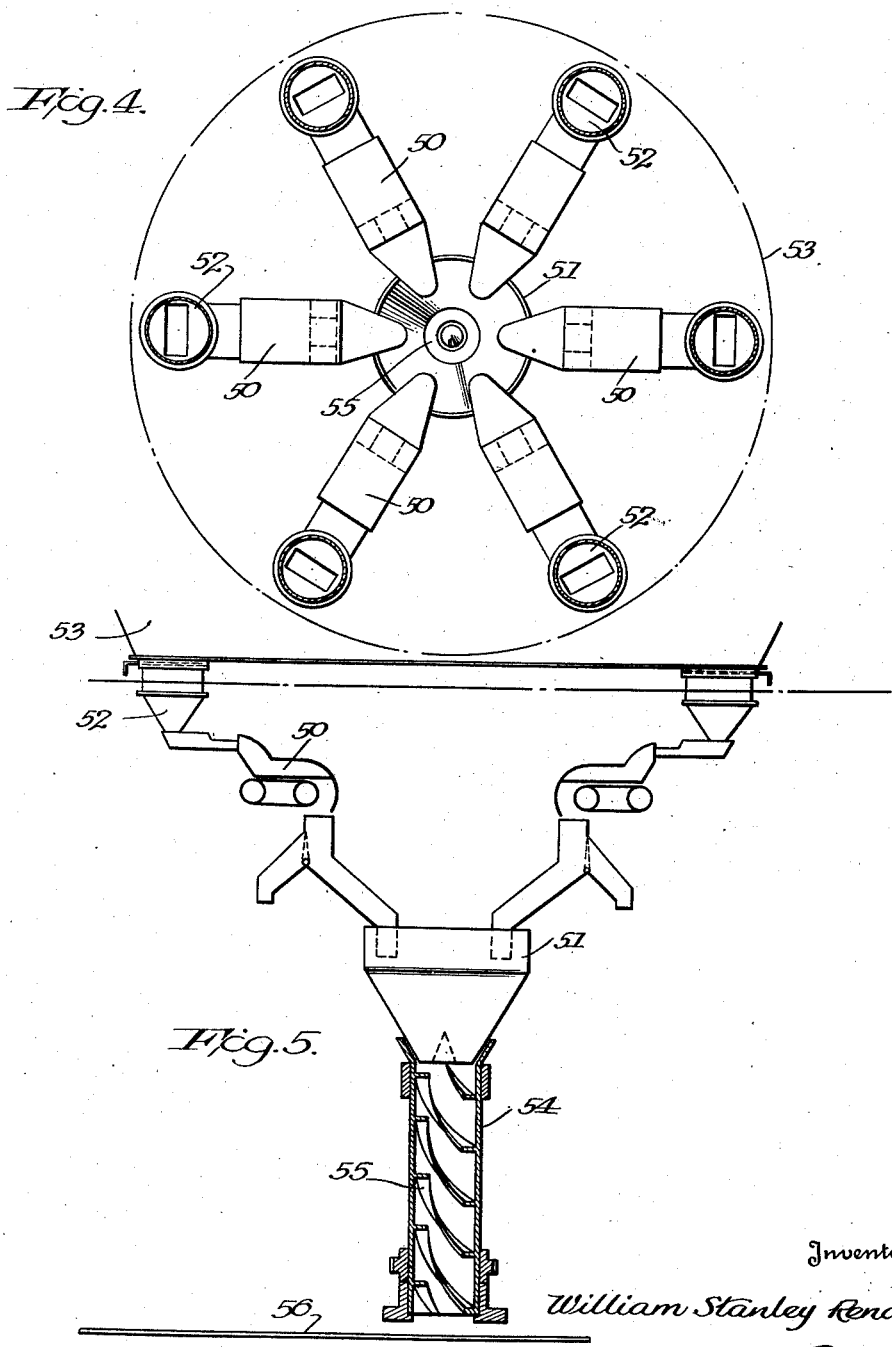

Patented Jan. 11, 1938

2,105,266

UNITED STATES PATENT OFFICE 2,105,266

METHOD OF AND APPARATUS FOR PROPORTIONING AND BLENDING GLASS BATCH MATERIALS AND THE LIKE

William Stanley Rendall, Baltimore, Md., assignor to Crown Cork & Seal Company, Inc., Baltimore, Md., a corporation of New York Application October 31, 1936, Serial No. 108,648

13 Claims. (Cl. 49—63)

The present invention relates to a new method of and means for proportioning and blending the granular, pulverized, powdered, crushed ingredients of aggregate materials, such as, for instance, glass making batch materials.

In the past it has been the common practice to mix definite quantities of the ingredients making up a glass batch in large mixing drums or the like. Predetermined quantities of sand, soda ash, lime, borax, feldspar, cullet and the like are mixed together in one large batch to provide a proper proportioned aggregate mixture of glass making materials. The mixed material is stored in bins or the like and fed to the furnace as desired. Considerable trouble has been encountered in batch mixing plants of this type because of the difficulty in securing a uniform mixture of the various ingredients and the resultant mixed batch has often been non-uniform in composition.

The present invention entirely does away with the usual large mixing drum. Instead of mixing the material in large "batches" in the mixing drum, each batch independent of the others, the present invention contemplates a continuous proportioning and blending operation. Thus, a constant supply of uniformly proportioned and blended material is always available for delivery to the furnace.

The basic idea of the invention resides in simultaneously feeding the several ingredients of the glass batch aggregate, each at a constant, predetermined rate corresponding to the proportions of the ingredients desired in the final mixture, and continuously conveying and blending the materials so fed. Instead of measuring or weighing predetermined quantities of each ingredient and then mixing them all together in a mixing drum, as is done in conventional batch plants, this invention contemplates utilizing constant weight feeders associated with each source of supply, to deliver simultaneously and constantly each ingredient at a predetermined rate. Constant weight feeders of extreme accuracy have recently been placed on the market, and the present invention contemplates using such feeders in a novel relation to certain other apparatus, to effect an accurate continuous proportioning and blending operation.

The several constant weight feeders are preferably arranged to deliver simultaneously, the granular material onto a traveling belt conveyor or the like, where the materials receive a preliminary mixing. Thus, each section of the material on the conveyor contains the proper proportions of ingredients to make a corresponding quantity of glass. The conveyor may discharge into a continuous blending funnel or directly into a collection receptacle so that, as the preliminarily blended materials fall into the collection receptacle, a secondary or final mixing and blending is effected.

In the alternative, the feeders can be arranged radially about a substantially common discharge point, and may discharge directly into a rotary blending funnel to effect a final blending of the several ingredients therein.

Means are provided for adjusting the rate of discharge of each feeder, to vary the proportions of ingredients in the final mix. Also, means are provided for selectively cutting in or cutting out each of the feeders, so that a wide variety of different types of glass batches can be made, by the elimination or the inclusion of different ingredients.

Means are provided for adjusting the speed of movement of the conveyor to control the degree of preliminary mixing and blending of the materials fed on to the conveyor by the feeders. If the belt is traveling rapidly when each material is deposited thereon, the inertia factor will cause a relatively violent agitation of the deposited material. Since the several materials are preferably deposited on the belt in relatively close proximity, before one ingredient comes to rest and is traveling in quiescent state thereon, another ingredient is added to the turbulent material already on the belt. Thus, the several ingredients become mixed together on the belt.

Control means for the feeders and for the conveyor are provided so that these devices will come to a stop after the passage of a predetermined period of time, when a predetermined amount of material has been delivered. Also, the invention contemplates an additional control means in the form of a weigh hopper adapted to cut off the operations of the feeders and of the conveying means when a predetermined amount of batch has been delivered by the conveyor, independently of the aforesaid time control means.

In the accompanying drawings,

Figure 4 is a plan view of a modified arrangement; and

Figure 5 is an elevation of the same.

Figure 3:
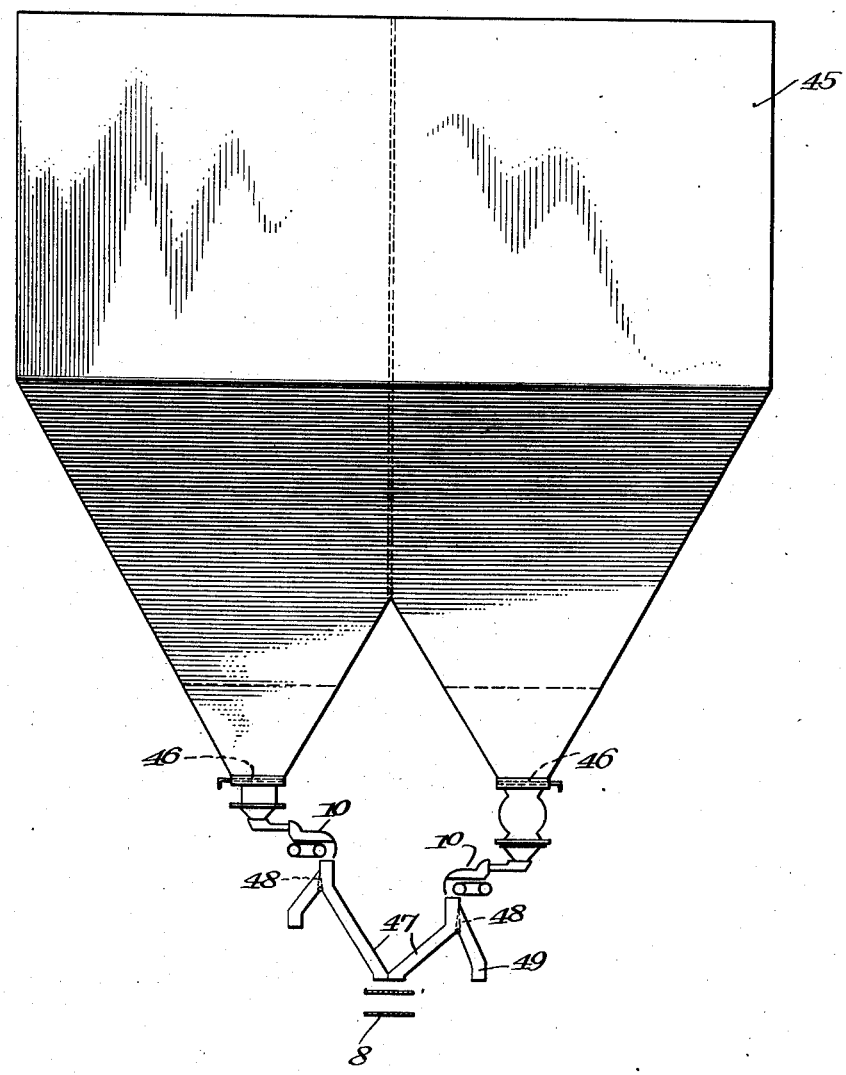
Figure 3 is an end view of Figure 2.

A plurality of storage compartments or bins 1, 2, 3, 4, 5, 6, and 7 may be arranged in any desired relation, preferably at a higher level than a traveling conveyor 8. As shown in Figure 3, the bins are preferably arranged in close proximity to one another to effect a discharge from each bin at a point adjacent to the discharge of the others. Each storage compartment communicates by means of a chute 9 with a constant weight feeder represented generally by reference character 10. The feeders discharge through chutes 11 onto the upper surface of the conveyor 8. At the discharge end 12 of the conveyor, a chute 13 is adapted to guide the material into a weigh hopper 14, in which the material is collected. A skip hoist 15 or the like is adapted to be brought periodically into cooperative charging relationship to the weigh hopper 14, to receive a charge of batch therefrom.

The constant weight feeders 10 may each be of the type known to the trade as the "Jeffrey-Traylor Constant Weight Feeder", manufactured by the Jeffrey Manufacturing Company of Columbus, Ohio. Such feeders comprise an electrically driven vibrating feeder plate 20, a balanced weighing belt 21 and electrical control means for the vibrator, actuated by the balanced weighing belt to effect a constant rate of discharge. Since the specific structure of the constant weight feeders is not a part of this invention, the specific structure thereof need not be described herein. Each feeder is provided with an adjustable control, whereby the discharge can be accurately adjusted to any desired rate within certain maximum and minimum limits. The control boxes for the feeders are shown diagrammatically at 22, 23, 24, 25, 26, 27, and 28 and, by means of adjustable features incorporated therein, the amount of material discharged by each feeder may be accurately controlled. The aforementioned control boxes are connected up with a master control box 29 in which is incorporated a selector drum 30. By means of this the circuits can be varied at will to render operative or inoperative, any desired combination of constant weight feeders. The master control box 29 also comprises clock control means 31, 32, which may be adjusted to determine the duration of time during which all feeders being used to form a particular batch are to be in operation. This clock control terminates the operation of all of the operative feeders 10 and the conveyor belt driving motor 39 after the passage of the desired time, and similarly again starts them.

The weigh hopper 14 serves to operate a scale 35 having an indicating arm 36 which moves to a predetermined point when a desired amount of blended batch has been discharged into the hopper. As an additional or alternative control means, the indicator arm 36 may affect an electric circuit 37 by means of an electric eye 38, to actuate the main control box 29, to terminate the operation of all of the operative feeders 10 and the conveyor belt driving motor 39, as aforesaid.

Figure 1:
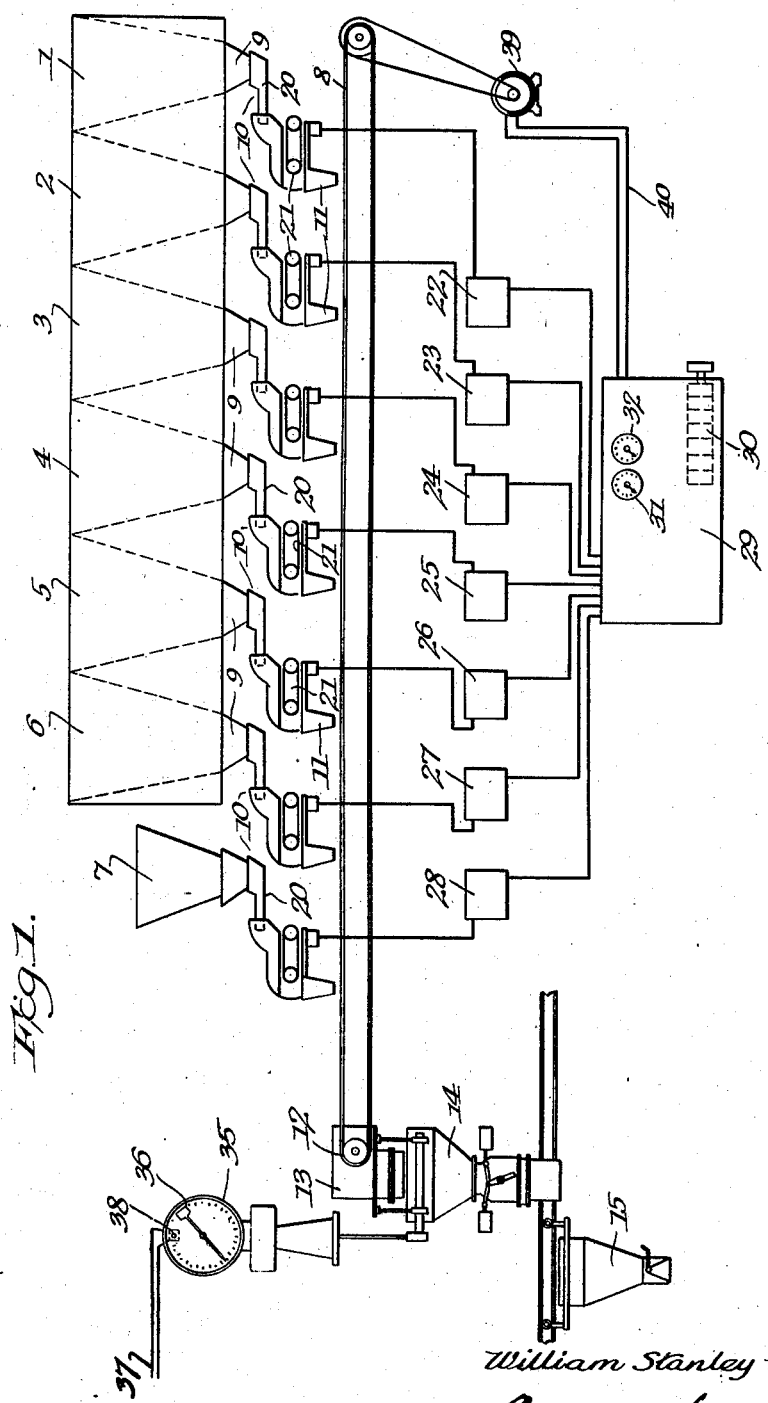
Figure 1 is a diagrammatic layout of a batch plant in accordance with the present invention.
Figure 2:
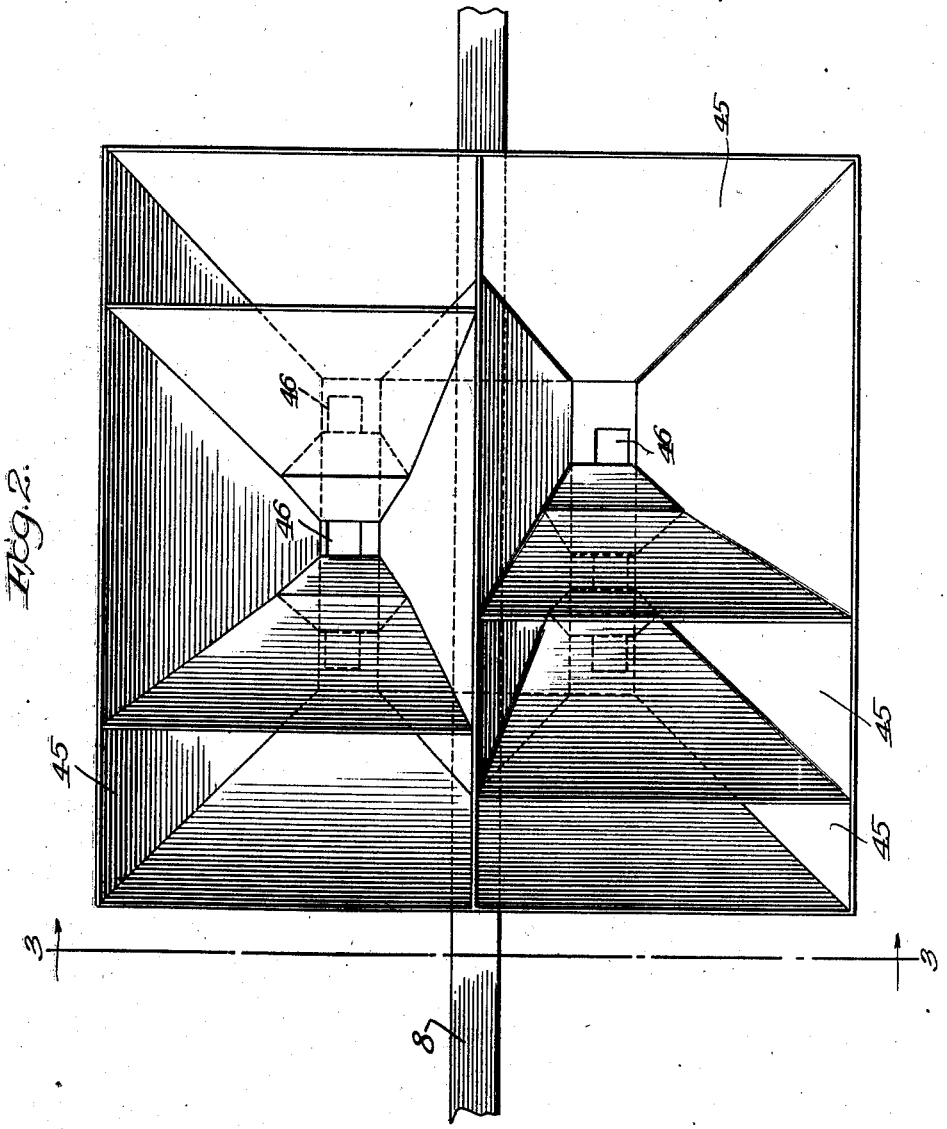
Figure 2 is a plan view of a multi-compartment bin.

Figure 2 represents a desirable manner of assembling the several storage receptacles in the form of a multiple compartment bin, the compartments being of different size to contain more or less material, depending generally upon the proportion of that particular ingredient normally used to make up a glass batch. Each compartment 45 feeds downwardly through a discharge opening 46 to one of the constant weight feeders 10 positioned therebelow. The feeders discharge successively upon the belt 8, so that the material is placed thereon in layers. The discharge chute 47 leading from each constant weight feeder 10 is preferably provided with a gate 48 and a branch discharge conduit 49 which may lead to a point remote from the belt, in case it is desired to collect unmixed material from one of the bins, or to empty the bin.

As stated above, the conveyor belt 8 is preferably driven at such a speed as to cause an agitation of each ingredient deposited thereon by a feeder 10. The inertia factor will prevent the material coming to rest immediately as soon as it is deposited on the traveling conveyor. It will roll or tumble along on the surface of the conveyor until its speed of movement is accelerated to correspond to the speed of movement of the belt. Before an ingredient has thus come to rest on the conveyor, another ingredient is added, and a mixing and blending of the two takes place. The action of the subsequently added ingredients is identical. Consequently, it is preferred to deposit the materials on the belt in close proximity to each other, for instance, by a construction of the type shown in Figures 2 and 3.

The form of the invention disclosed in Figures 4 and 5 accomplishes the same result, and is preferred in some cases because of its simplicity. A plurality of feeders 50, which may be of the same type as the feeders 10 referred to above, are arranged circumferentially around, and radially with respect to a collection hopper 51. Each feeder receives material from a discharge spout 52 of a multiple compartment bin 53 or the like. Below the collection hopper 51 there is disposed a mixing and blending funnel or conduit 54, mounted for rotation about its longitudinal axis and provided with mixing vanes 55 or an equivalent means for mixing and blending the collected ingredients. This mixing and blending device may discharge upon a conveyor 56, or directly into a storage receptacle of any kind. In the alternative, the mixing and blending means may discharge into a skip hoist, bucket elevator, railway car, or any other conveyance.

In the operation of the machine of the present invention, the selector drum 30 is set in such a manner that all of the feeders associated with the storage receptacles 1 to 7 will be rendered operative, or any desired combination of feeders. Each feeder, by means of its control box, and the adjustable counterpoise associated therewith, will be adjusted to deliver a predetermined quantity of material in a predetermined period of time. In other words, the rate of discharge of each feeder will be adjusted. The time control means 31, 32 will be adjusted to permit the simultaneous operation of the selected feeders and of the conveyor belt 8 for a period of time sufficient to permit the feeders to discharge an amount of material equal to that desired.

The scale arm 36 will be used to check the poundage or tonnage discharged in each load to be carried by the skip hoist 15.

The skip hoist will be brought into operative position under the weight hopper 14 and the apparatus will be set in motion, either automatically, or manually. Thereupon, each feeder will proceed to deliver simultaneously the exact proportion of material desired in the final batch. The several streams of the individual ingredients issuing from the different feeders will be deposited upon the conveyor 8 in blended form in a composite stream, which will be discharged at the end 12 into the weigh hopper 14. When the desired amount of material has been collected in the weigh hopper, the master control 29 will be actuated by the time control to cut off the feeders and the motor 39 which drives the conveyor. Simultaneously, and by means not shown, the weigh hopper will dump its contents into the skip hoist 15 and the latter will proceed on its way to charge a furnace. As soon as the discharging operation has been completed, the gate of the weigh hopper will be closed and after a desired time delay, the control 29 will again serve to start the feeder in operation and the belt 8 moving.

It has been found desirable in some cases to provide both a weight control in the form of the scale means 35, and a time control, as represented diagrammatically at 31, 32 although, usually this dual control is unnecessary. Moreover, if the blending and mixing conveyor belt 8 is discharged directly to a traveling conveyor leading to the furnace or to a large storage receptacle, the weigh hopper 14 and the time control means are both unnecessary or means can be provided for rendering them both inoperative.

The invention contemplates either a continuous operation of the feeders and the mixing and blending means, or an intermittent operation of these units. In the former case, it is unnecessary to provide automatic means for stopping the operations of the feeders and mixing and blending means and for initiating operation of the same after the lapse of a predetermined time. On the contrary, the control may consist merely of manually operated means to start and stop the operation.

I claim:—

1. The method of proportioning and mixing and blending the ingredients of a dry, pulverant glass batch mixture which comprises continuously and simultaneously for a predetermined period of time feeding the several ingredients in dry, pulverant state from separate sources of supply at rates corresponding to the proportions desired in the final mixture, continuously assembling and forming the materials as they are so fed into a composite stream, depositing and collecting the stream of dry, pulverant materials simultaneously to effect a mixing and blending thereof in that condition in the proper proportions, and automatically and simultaneously terminating the feeding of the materials, the forming of the same into a stream and the depositing and collecting of the materials after said predetermined period of time.

2. The method of proportioning and mixing and blending the ingredients of a dry, pulverant glass making batch mixture which comprises providing a separate source of supply of each ingredient of the mixture, continuously and simultaneously delivering for a predetermined period of time, material from each of said sources and at rates adjusted according to the proportion of each ingredient desired in the final mixture, collecting the several ingredients in dry state in a composite mass upon a traveling conveyor, continuously dumping the composite materials at the discharge end of the conveyor in a dry mixed and blended heap at a collection point, and automatically and simultaneously terminating the delivery, collection, and dumping of the materials after said predetermined period of time.

3. The method of proportioning, mixing and blending the ingredients of a dry, pulverant glass making batch of predetermined composition and amount, which comprises simultaneously feeding the ingredients from separate sources of supply at different predetermined rates to deliver from each source in a predetermined period of time, an amount of each ingredient equal to the amount desired in said predetermined amount of batch, assembling the ingredients so fed in a composite stream on a traveling conveyor, discharging the stream from the conveyor at a point of collection to effect a mixing and blending of the material formerly on the conveyor, and automatically terminating the feeding of the ingredients and the discharge of the stream from the conveyor at the end of said predetermined period of time.

4. Apparatus for proportioning, mixing and blending the ingredients of glass batch material, comprising storage compartments for each ingredient, separate independently adjustable feeding means for each compartment adapted to feed material therefrom at an adjustable, predetermined, constant rate, adjustable automatic control means to initiate, continue and terminate the operation of each feeder simultaneously, means for continuously collecting the several materials delivered by said feeders, means for continuously mixing the collected materials, said control means serving to initiate, continue and terminate the operation of the collecting and mixing means simultaneously with the operation of each feeder.

5. Apparatus for proportioning, mixing and blending the granular ingredients of a glass making batch aggregate comprising a storage bin having a plurality of independent compartments therein communicating with independent discharge chutes, an adjustable vibrating feeder adapted to deliver granular material at a constant rate associated with each chute, a moving conveyor arranged below the several feeders and adapted to receive the materials discharged therefrom on its conveying surface, a collection receptacle adjacent and spaced below the discharge end of the conveyor, and automatic control means for the conveyor and the feeders to terminate their operations when a predetermined amount of material has been discharged from said conveyor into said collection receptacle.

6. A plant for mixing and blending glass batch materials or the like, comprising independent storage means for the several ingredients of the batch, means for simultaneously feeding the material from each storage means at an adjustable constant rate, collecting and conveying means for collecting the material fed from said feeding means and for delivering the same to a discharge point, and control means for said feeding means and for said collecting and conveying means, said control means being actuated automatically to terminate the feeding, collecting and delivery of said materials after the passage of a predetermined, adjustable period of time.

7. A plant for mixing and blending glass batch materials or the like, comprising independent storage means for the several ingredients of the batch, means for simultaneously feeding the material from each storage means at an independently adjustable constant rate, a conveyor for collecting the material fed from said feeding means and adapted to deliver the same to a discharge point, and automatic control means for said feeding means and for said conveyor, said control means being automatically actuated to terminate the operations of the aforesaid means and the conveyor upon the passage of a predetermined period of time and therefore upon the delivery of a predetermined weight of mixed and blended materials.

8. A plant for mixing and blending glass batch materials or the like, comprising independent storage means for the several ingredients of the batch, means for simultaneously feeding the material from each storage means at an independently adjustable rate, a conveyor for collecting the material fed from said feeding means and adapted to deliver the same to a discharge point, and automatic control means for said feeding means and for said conveyor, said control means being automatically actuated to initiate the operations of the feeding means and of the conveyor simultaneously and being actuated to terminate their operations upon the passage of a predetermined period of time and thereafter to again initiate the operations of said means and the conveyor after a predetermined, adjustable time delay.

9. A plant for mixing and blending glass batch materials or the like, comprising independent storage means for the several ingredients of a plurality of different glass batch compositions, a feeder for each storage means adapted to feed the material therefrom at an adjustable constant rate, an electrical selector associated with said feeders and being adjustable to render operative various combinations of feeders according to the composition of the glass batch desired, a conveyor for collecting the material fed from each operative feeder and adapted to deliver the same to a discharge point, an automatic control means for said feeders and for said conveyor, said control means serving to initiate continual, and terminate simultaneously, the operations of said feeders and said conveyor.

10. A plant for mixing and blending glass batch materials or the like, comprising independent storage means for the several ingredients of the batch, means for simultaneously feeding the material from each storage means at an independently adjustable constant rate, mixing and blending means for the material fed from said feeding means and adapted to deliver the same to a discharge point, and clock actuated control means to continue for a predetermined adjustable period of time the operations of said feeding means and said mixing and blending means and then to terminate the same, said control means also serving to again initiate the operation of said means after the passage of a predetermined adjustable period of time.

11. A plant for mixing and blending glass batch materials or the like, comprising independent storage means for the several ingredients of the batch, means for simultaneously feeding the material from each storage means at an independently adjustable constant rate, collecting and conveying means for collecting the material fed from said feeding means and for delivering the same to a discharge point, a hopper, at said discharge point adapted to receive said materials, scale means associated with said hopper, and control means actuated by said scale means to terminate the operations of said feeding means and said collecting and conveying means upon the delivery of a predetermined, adjustable weight of material into said hopper.

12. A plant for mixing and blending glass batch materials or the like, comprising independent storage means for the several ingredients of the batch, means for simultaneously feeding the material from each storage means at an independently adjustable constant rate, collecting and conveying means for collecting the material fed from said feeding means and for delivering the same to a discharge point, a hopper at said discharge point adapted to receive said materials, scale means associated with said hopper, and automatic control means for said feeding means and said collecting and conveying means, said control means being clock actuated to terminate the operations of said means after the passage of a predetermined period of time and also being actuated by the scale means associated with said hopper to terminate the operation of said means upon the delivery of a predetermined weight of material into the hopper.

13. A plant for mixing glass batch materials or the like, comprising independent storage means for the several ingredients of the batch, means for simultaneously feeding the material from each storage means at an independently adjustable constant rate, said feeding means being constructed and arranged to deliver the fed material substantially at a common collection point, means at said common point for mixing and blending the material and for discharging the mixed and blended materials.

WILLIAM STANLEY RENDALL.